United States Patent [19]

Collins et al.

[11] Patent Number: 5,003,595

[45] Date of Patent: Mar. 26, 1991

[54] SECURE DIAL ACCESS TO COMPUTER SYSTEMS

[75] Inventors: Cynthia B. Collins, Basking Ridge; Francis T. Lynch, Budd Lake; Kay L. Mueller, Rumson, all of N.J.

[73] Assignee: AT&T Bell Laboratories, Murray Hill, N.J.

[21] Appl. No.: 399,808

[22] Filed: Aug. 29, 1989

[51] Int. Cl.[5] .............................................. H04L 9/32
[52] U.S. Cl. ....................................... 380/25; 380/49; 379/95; 340/825.31; 340/825.34
[58] Field of Search ................... 364/200, 900; 380/23, 380/25, 3-5, 49-50; 379/95; 340/825.34, 825.31

[56] References Cited

U.S. PATENT DOCUMENTS

| | | | |
|---|---|---|---|
| 3,245,045 | 4/1966 | Randlev | 364/200 |
| 3,702,987 | 11/1972 | Twyford | 340/825.34 X |
| 4,531,023 | 7/1985 | Levine | 379/95 |
| 4,694,492 | 9/1987 | Wirstrom et al. | 380/23 |
| 4,876,717 | 10/1989 | Barron et al. | 380/25 |

*Primary Examiner*—Stephen C. Buczinski
*Assistant Examiner*—Bernarr Earl Gregory
*Attorney, Agent, or Firm*—Werner Ulrich

[57] ABSTRACT

This invention relates to a method and apparatus for making it difficult for unauthorized callers to access a target computer such as a data base for providing data to and accepting orders from agents. The caller is identified by an arrangement that is relatively secure from tampering. The caller's telephone number is identified by Automatic Number Identification (ANI) and forwarded to an adjunct processor associated with the target computer. The ANI number is compared with a stored list of authorized ANI numbers and if there is a match, the caller is connected to the target computer. The arrangement also provides other facilities including automatic rejection of calls from a second list of ANI numbers, trapping of calls from a third list of ANI numbers and facilities for permitting authorized agents calling from unauthorized numbers to access the target computer. Advantageously, an arrangement, ANI, which is highly resistant to tampering is used for identifying the caller, thus making it very difficult for unauthorized callers to get access to the target computer.

14 Claims, 4 Drawing Sheets

ADJUNCT PROCESSOR

TRAP PROCESSOR

SECURE DIAL ACCESS TO COMPUTER SYSTEMS

TECHNICAL FIELD

This invention relates to methods and apparatus for providing secure dialable access to a target computer.

PROBLEM

In recent years there has been an increasing demand for dial-up access to target computers such as centralized host computers or centralized data bases. One example of this kind of application is one wherein a manufacturer maintains a data base for controlling orders for spare parts which is accessible from a large number of franchise dealers. A problem with such dial-up data bases is that they must be secure from the intrusion of outsiders with malicious intent who might mutilate the data in a data base, for example, by placing a very large false order to a particular part thereby making the spare part unavailable for other dealers. There have been instances in which a malicious user completely mutilated data files requiring a very large effort to restore them to a working basis.

In some cases, these target computers are accessed by 800 numbers which means that the bill for calls is accepted by the owner of the target computer and not the callers. In such cases, malicious unauthorized users who are trying to access the data base have used personal computers programmed to place large numbers of calls to tray different permutations of possible logins and passwords in an attempt to access the target computer; under these circumstances the owner of the target computer has sometimes been faced with very large non-revenue producing telephone bills to pay for the efforts of those who are trying to gain unauthorized access to the data base.

The most common way of protecting these target computers from unauthorized access is to screen calls with a device that contains a list of telephone numbers of agents authorized to access the target computer. When a call is received from one of these agents, the device calls that agent back using one of these previously recorded telephone numbers. This procedure is inconvenient for the agent because the agent must call, login to the device, and then disconnect and wait for the return of the call. The procedure is also expensive because it requires special equipment for dialing the new connection, and is limited because it is difficult economically to accommodate a large number of users with presently available dial back equipment. The convenience factor is particularly important since the owner of the target computer is frequently dependent upon the business brought by the agents or franchises. An arrangement using an adjunct processor for processing logins and for automatically initiating a call back for connecting the target computer to the user is described in a co-pending application by S. Barron et al., Ser. No. 205,054, assigned to the assignee of this invention, now U.S. Pat. No. 4,876,717.

An alternate approach to protecting these target computers against intrusion from unauthorized users is to provide good login procedures. Such procedures have not always been tamperproof in the past and further, in many cases the users of the target computer are not sophisticated computer users and therefore the login procedures must necessarily be straightforward.

Another approach is to provide a caller with a special device which performs a calculation or carries out some function that is difficult for an unauthorized caller to copy. One example of this is the Secure Net Key ™ device used with the Defender II ™ system provided by Digital Pathways, Incorporated. Each user is provided with a special calculator that includes a personalized algorithm. When the user calls into the system, the system generates a random number and subjects that random number to the inverse of the calculation associated with the caller. The caller then receives the results of this calculation, performs the calculation using his own unit, and returns the result of this calculation back to the system. If the result matches the random number originally generated in the data base system, the caller is authorized. This arrangement, while being relatively tamperproof, is very difficult for inexperienced agents to use, and requires the use of an expensive device which, if lost to an unauthorized user, leaves the target computer defenseless.

Arrangements for intercepting calls from certain telephone numbers, or for only letting calls from certain telephone numbers complete are disclosed in D. Sheinbein, U.S. Pat. No. 4,277,649. The telephone numbers of the callers are identified by automatic number identification (ANI). These arrangements are completely controlled from a common carrier switching office, thus limiting the ability of an administrator of a target computer to customize the process of accepting or rejecting calls in accordance with the special needs of a particular business.

A problem of the prior art therefore is that arrangements for ensuring that only authorized users can receive direct dial-up access to a target computer are either inconvenient, inflexible, or expensive.

SOLUTION

The above problem is solved and an advance is made over the prior art in accordance with a new method and apparatus wherein a public switched network provides the number of the caller as identified, illustratively, by automatic number identification (ANI), to an adjunct processor for a target computer, the caller's number is then compared with a list of authorized numbers and the caller is connected to the target computer only if the number matches one of these authorized numbers.

In order to make a dial up access system secure, it is important that the identification of the calling location be secure. ANI is one secure method of identifying a caller since it is not supplied by the caller, but is determined within the public switched network, and is therefore highly tamperproof. Caller supplied caller identification is, of course, much less secure and would not be appropriate for this type of application. However, any secure identification of the caller, that is, an identification which is not under the control of the caller, is satisfactory for the purposes of this invention. While the most common callers are persons operating a terminal, the caller may also be a computer or terminal programmed to call automatically.

In one specific implementation, an integrated services digital network (ISDN) primary rate interface (PRI) is used to connect a switching system of a public switched network to a private branch exchange (PBX) connected to ports of a target computer. The PBX has an adjunct processor for comparing the caller's number as identified by automatic number identification with lists of prestored numbers. If the number matches one of these lists of prestored numbers, the call is routed by the PBX to one of a set of ports of the target computer. Routing by list enables legitimate users to be directed to the ports associated with the particular application they need to access or with the particular data networking hardware they use.

In accordance with one aspect of the invention, the adjunct processor also maintains a separate list of numbers associated with callers that are to be rejected. This number list is built up as a result of having had a large number of calls from a particular number, none of which calls ever resulted in a successful login. The list is administratable by a security administrator. If calls come from one of these numbers, the call is simply not accepted. In accordance with one aspect of this feature, answer supervision is not returned for this call, so that if an unauthorized call is made to an 800 number, the owner of the target computer will not in general be charged for the call.

In accordance with another aspect of this invention arrangements are available to trap malicious unauthorized users by accepting calls from these users, identified by a special list of numbers, in a specialized way. The calls are routed to a processor containing special programs to trap such callers. Records of such calls can be useful in subsequent prosecution of such malicious callers.

In accordance with another aspect of the invention, for calls which are from numbers that are not in the accept list and not in the reject or trap lists, further attempts are made to allow such calls to login using special login procedures and under some circumstances to help the caller reach an operator for assistance. These calls are subjected to special login procedures. Such calls might come, for example, from traveling agents who must of necessity make calls from unplanned telephone stations lacking telephone numbers on a previously defined list. Such special login procedures would include an initial simple special login which permits the traveling agent to identify himself or herself. This login is followed by prior art security procedures for verifying the identity of the caller, such as a request for the caller's mother's maiden name, or a machine generated password, or a zero proofing algorithm procedure similar to the Secure Net Key device described above. Illustratively, for calls which fail the special login procedures, a display providing the telephone number of an operator accompanied by an audio announcement to the same effect is returned to the caller so that new users can be helped. Further, whenever there is an indication of many attempts to access the system from the same caller, this can be brought to the attention of a system administrator for appropriate action. The appropriate action in many cases will be to call a new user who may be having initial problems accessing the system. In other cases, the system administrator will add the caller to the disconnect list or the trap list.

In accordance with another aspect of the invention, arrangements are provided for processing calls when no user identification is received. This situation may occur if the user is calling from a location served by a switching system that does not forward an ANI number to the public switched network. Such users can then be processed using special login procedures. Based on the caller's simple login, the caller is dialed back. If the caller is a traveling user, the caller is given extended login treatment as for callers with unrecognized caller identification.

In accordance with another aspect of the invention, all calls to the security system are recorded. These records allow legitimate users to be billed for the calls and allow illegitimate users to be detected and prosecuted. Provisions are included for long-term archieving of these records.

In accordance with another aspect of the invention, all calls to the security system are counted by ANI number. When the count exceeds a threshold within a given amount of time, the security administrator is notified. The security administrator will place the ANI number on the disconnect list or the trap list.

DETAILED DESCRIPTION

Figure 1:
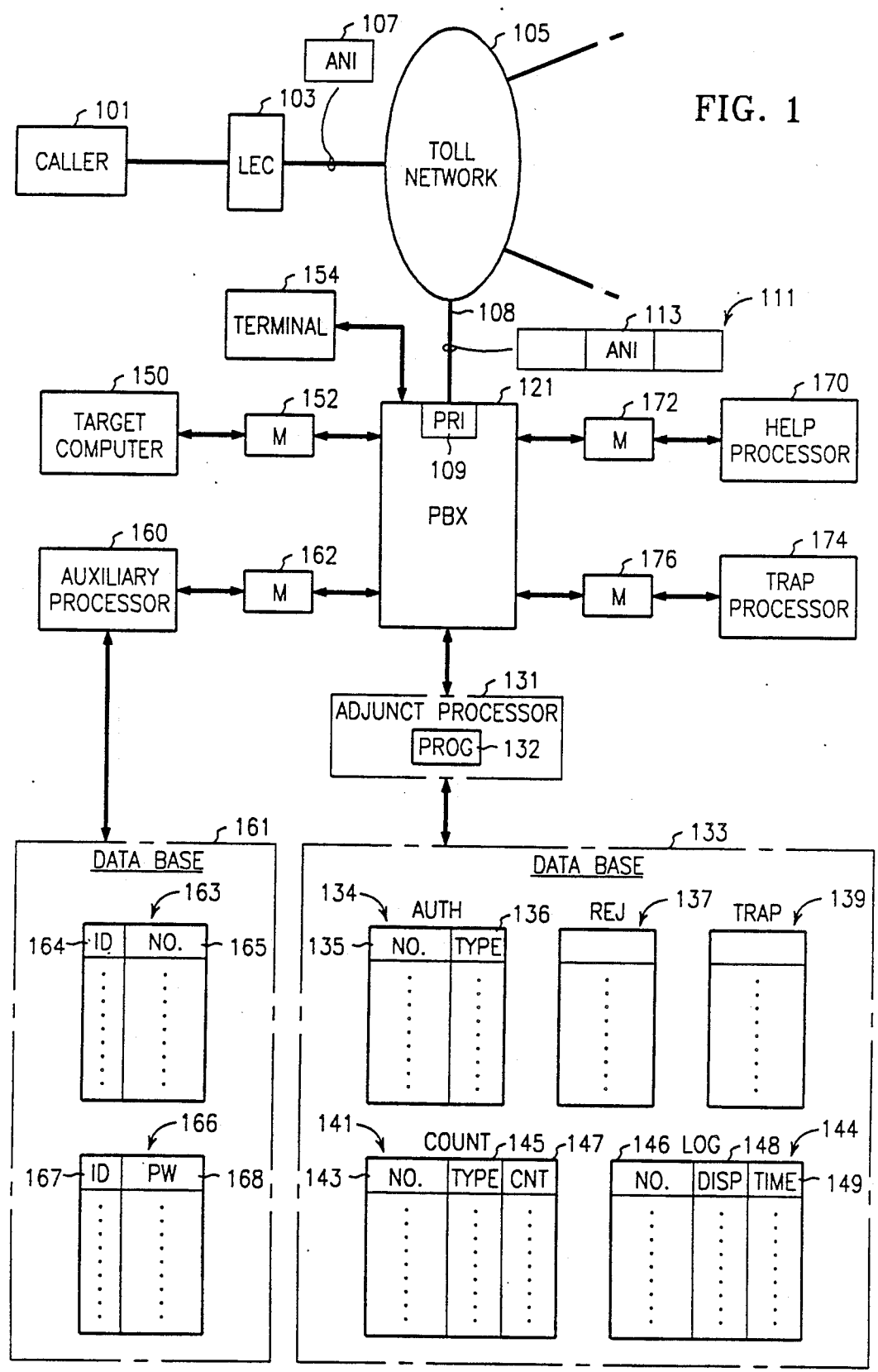
FIG. 1 is a block diagram of the operation of the invention showing processors for ascertaining caller authorization.

FIG. 1 is a block diagram illustrating the operation of the invention. A caller 101 is connected through a local exchange carrier 103 to a toll network 105. The local exchange carrier provides the toll network 105 with the billing number of the caller as identified through automatic number identification via a message 107 or via a series of digits transmitted though a signaling system such as the multifrequency signaling system. The toll network is connected to the PBX 121 which accesses the target computer 150 over an access facility 108 through an Integrated Services DIgital Network (ISDN) primary rate interface (PRI) connection 109. The D-channel of this primary rate interface carries a setup message 111 including the automatic number identification number 113 to the PBX 121. PBX 121 passes this automatic number identification number to adjunst processor 131, a processor that, in common with other processors 160, 170 and 174, is controlled by a program, in this case program 132. The adjunct processor 131 has as associated data base 133 which stores a list 134 of numbers 135 authorized to access the target computer, and, optionally, an indication 136 of the type of user in case different types of users are connected to different ports of the target computer. Effectively, the type indicator is a way of permitting a plurality of sublists, one for each type to be combined in one list. In addition, the data base also stores a list 137 of numbers to be rejected outright and a list 139 of numbers whose callers are to be routed to a trap processor. The adjunct processor also maintains records 141 by the ANI number of the calls. These records include the ANI number 143, the optional type of service requested 145, and a count 147 of the number of calls. These records are used to provide immediate notification of break-in attempts or legitimate user problems. They are also stored for later analysis.

The data base also contains a log 144 for maintaining records of all calls. The log contains the automatic number identification number 146, the disposition of the call 148 (whether the call was accepted or rejected, and which of the processors the call was routed to) and the time of the call 149. This log is periodically archived and, where appropriate, printed for the use of the system administrator. The system administrator has access to the adjunct and auxiliary processors at terminal 154, connected via PBX 109 to these processors.

If the call is accepted, it is routed via modem 152 to a port on target computer 150. More generally, if the target has groups of ports for different users, the type of user is identified from the type indication 136 of table 135 associated with the billing number, and the caller is connected to a port for that type of user. If the call is rejected, it is not routed further from the PBX and the caller never receives answer supervision; consequently even if this is a call to an 800 number, the owner of the target is generally not charged for the call. If the call is to be trapped, the call is routed via PBX 121 to trap processor 174 via modem 176. If the caller's number is not on either the authorized reject or trap list, then call is routed via modem 162 to auxiliary processor 160 for further verification as described below. If the result of the further verification is that the caller is authorized to access the target computer then the call is transferred via PBX 121 to target computer 150. If the call is rejected in the auxiliary processor then the call is rerouted from PBX 121 via modem 172 to help processor 170. The help processor will then generate a help screen for transmission back to the caller so that the caller receives a telephone number which may be called for assistance. In addition, the help processor may cause an audible help message to be transmitted back to the caller.

Some customers may prefer to reject any call which is not on the authorized list 135 of the adjunct processor. Such calls would then be rejected without being routed to the auxiliary or trap processor.

While in this preferred embodiment separate processors are used for the roles of adjunct processor, trap processor, auxiliary processor, help processor and target computer, several of the roles may e given to one processor or computer.

If the auxiliary processor recognizes a situation wherein no ANI number has been provided but the caller identifies himself as a caller from a fixed location whose serving office does not provide automatic number identification, then the auxiliary processor causes a dial back connection to be established to the caller at a number stored in tables of the auxiliary processor. The dial back connection is then established from the target computer via the PBX to the caller.

Figure 2:
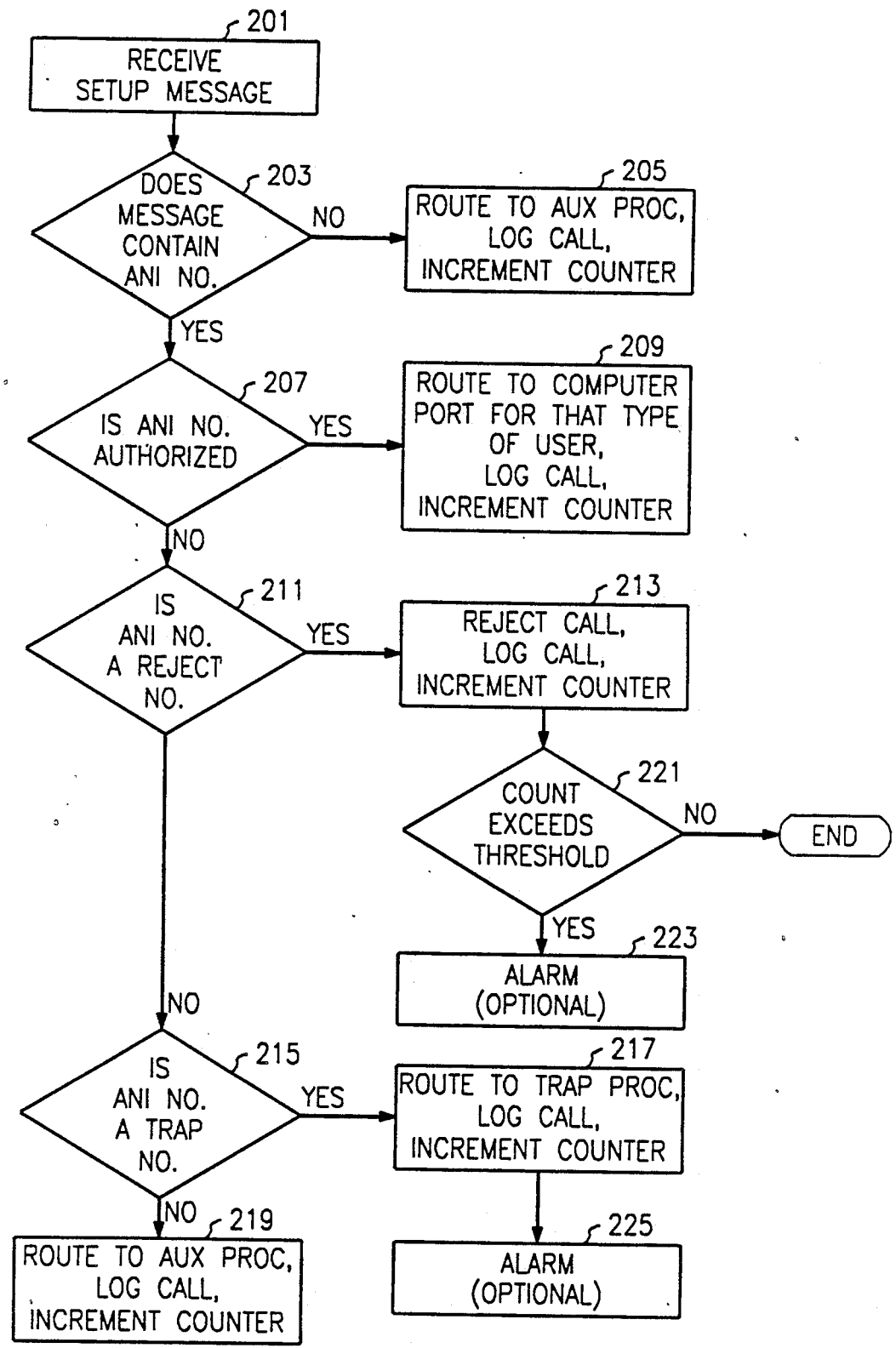
FIGS. 2 and 3 are flow diagrams of programs executed by these processors.

FIG. 2 is a flow diagram of actions performed by the adjunct processor 131. The adjunct processor receives a call setup message from PBX 121 (action block 201) and checks whether the setup message contains an ANI number (test 203). If not, this is an indication that the call came from a caller connected to a local exchange carrier that did not provide for the forwarding of an ANI number. If that is the case, then the call is routed to the auxiliary processor for further login procedures (action block 205). In addition, the count of attempts from locations not served by local exchange carriers that forward the ANI number is incremented and the call is logged.

If the setup message does contain an ANI number, a check is made in the adjunct processor whether this is an authorized ANI number (test 207). If so, then the type of port for that user is used to select a port of the target for handling calls from that type of user and the call is routed to that port of the target (action block 209), the call is logged and the count of calls from that ANI number is incremented.

If the ANI number is not an authorized ANI number, then the ANI number is checked to see if it is in the list of ANI numbers to be rejected (test 211). If so, then the call is rejected (action block 213), a record of the call is made in the log, and the count of calls from that ANI number is incremented. This rejection, as previously indicated, is made without returning answer supervision to the caller so that there is generally no charge for this call. The count of the number of calls from this ANI number is compared to a threshold (test 221) and if it exceeds this threshold, preset, for example, by a security administrator, an optional alarm is given (action block 223).

If the ANI number is not on the list of rejected ANI numbers, then a further test is made to see whether the ANI number is on the list of ANI numbers to be trapped (test 215). If so, then the call is routed to the trap processor (action block 217), the call is logged, and the count of calls from that ANI number is incremented. An optional alarm is also given (action block 225).

If the ANI number is also not on the list of ANI numbers to be trapped then the call is routed to the auxiliary processor for extended login procedures and the call is logged and the count for calls from that ANI number is incremented (action block 219).

Figure 3:
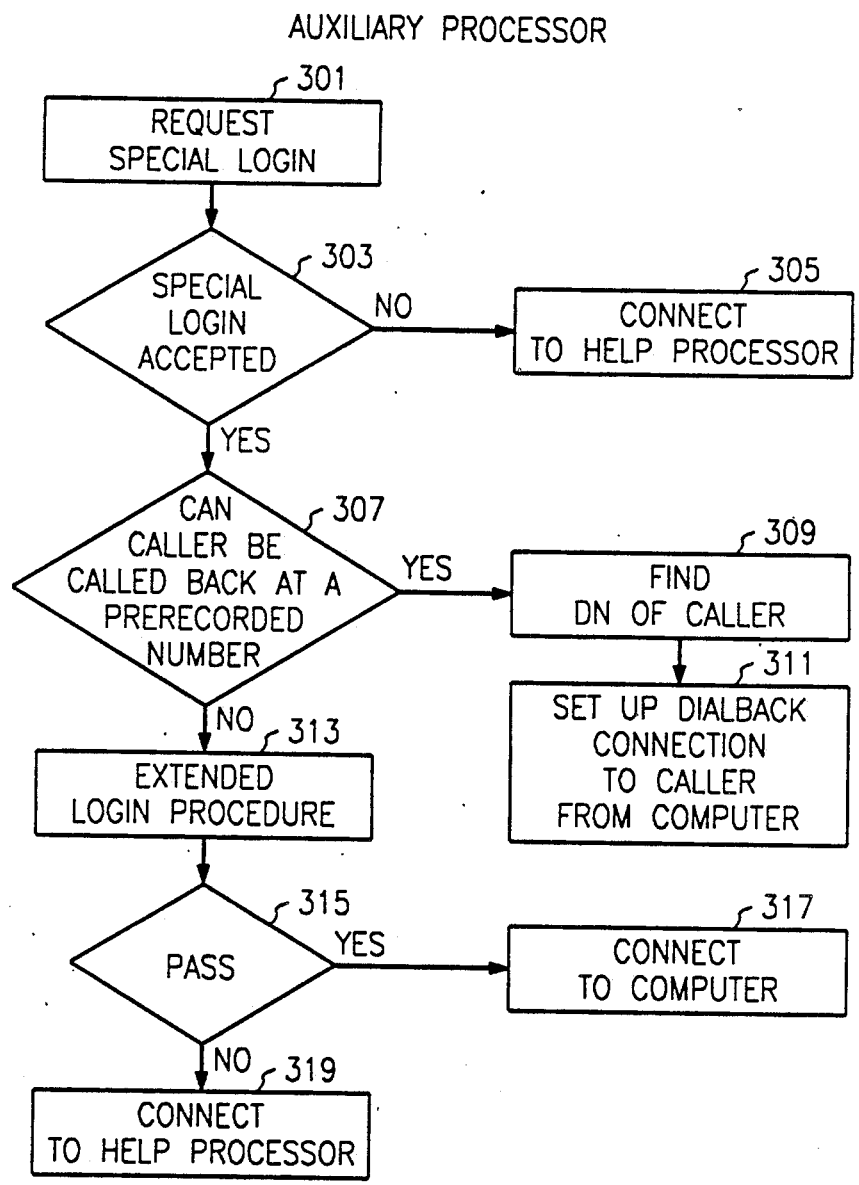

FIG. 3 is a flow diagram of actions performed in the auxiliary processor. The auxiliary processor receives calls which either had no ANI number (negative result of test 203), or whose ANI number was not on any of the lists of authorized rejected or trapped ANI numbers. The auxiliary processor requests a special login (action block 301). This special login may simply represent the name of the agent. The purpose is merely to establish on a preliminary basis whether the call is from a known traveling agent or other agent known to the system though not identified by an ANI number. Test 303 checks whether the special login was accepted, i.e., that that particular login identification is known to the system. The test is performed by searching the data base 161 of auxiliary processor 160 to find an identification such as 164 in table 163 or 167 in table 166. If the result of test 303 is negative, i.e., that the special login is not known to the system, then a connection is set up to a help processor (action block 305). Such a help processor would, for example, send an audible message and a video screen identifying a number to be called to receive additional instructions. This leg of the program might represent, for example, newly attached agents or agents for whom records had not yet been made in the adjunct processor.

If the special login is accepted (positive result of test 303), then test 307 checks whether that caller has an identification listed in table 163 can be called back at a prerecorded number 165 corresponding to an identification 164. If so, dial back procedures will be used to establish the call. First, the prerecorded directory number of the caller is found (action block 309) and a connection is set up from the target to the caller using dial back procedures (action block 311). This portion of the program is used for calling callers who are connected to local exchange carriers that do not forward an ANI number or from callers calling from within a PBX whose specific ANI number is not sufficient to reliably establish the identity of the specific calling location. Dialback is a reliable method of authenticating communications and is equivalent to the degree of security attained from receiving an ANI number that is on the list of authorized ANI numbers.

If the result of test 307 is negative, that is that the caller cannot be called back at a prerecorded number because, for example, the caller is a traveling agent calling from a hotel or a site of the agent's customer, then a more extended login procedure (action block 313) is used to verify that this is, in fact, a traveling agent and not an unauthorized user.

In this case, the caller identification is in table 166 which contains data such as a password 168 corresponding to identification 167 for verifying the identity of the caller. Examples of this extended login procedure are to request one of a number of specialized passwords associated with the agent as identified by the special login; these special passwords might be, for example, a social security number, mother's maiden name, child's birthday etc. Other extended login procedures might be procedures used in connection with a zero proofing algorithm as previous described in the problem section of this application, or recognition of a signal from a "smart card". Test 315 checks whether the extended login procedure was passed. If so, then the call is connected to the target (action block 317); otherwise a connection is set up to the help processor (action block 319).

Figure 4:
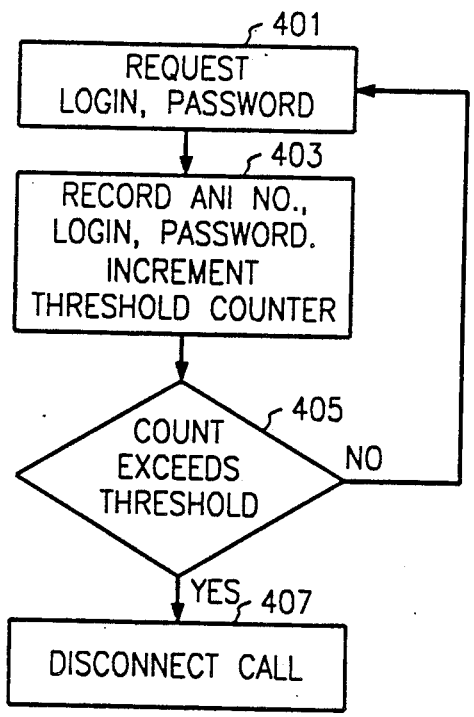
FIG. 4 is a flow diagram of a program executed by a processor for trapping unauthorized callers.

FIG. 4 is a flow diagram of actions performed in the trap processor. The objective of these actions is to attempt to capture information which identifies the caller as performing unauthorized acts such as trying a large number of passwords on a random basis in an attempt to be logged onto the target computer. The trap processor, therefore, first issues a request to the caller to submit his login and password (action block 401). The trap processor then records the login and password along with the ANI number associated with the trapped call and increments the count of password attempts (action block 403). Test 405 checks whether this count exceeds some threshold. If not, then action block 401 is performed again and another attempted password is recorded. If he count exceeds the threshold, then the call is disconnected (action block 407).

It is to be understood that the above description is only of one preferred embodiment of the invention. Numerous other arrangements may be devised by one skilled in the art without departing from the spirit and scope of the invention. the invention is thus limited only as defined in the accompanying claims.

We claim:

1. A method of obtaining secure authenticated telecommunications access via a communications network to a target computer comprising the steps of:

in a processor means for authenticating access to the target computer, responsive to receipt of a call and called at a for said call over an access facility from said network, the call data comprising a number of a caller supplied by said network, testing whether the number is in a list of numbers of users authorized to access the target computer; and if the number is in the list, connecting the call to the target computer;

responsive to receipt of said call, testing whether the number is in a reject list of the processor means; and if the number is in the reject list, disconnecting the call;

receiving additional repeated calls and repeated call data for said additional calls, said repeated call data comprising a specific number, the specific number not being on the list of numbers authorized; and responsive to receiving the additional repeated call data calls, adding the specific number to the reject list.

2. A method of obtaining secure authenticated telecommunications access via a communications network to a target computer comprising the steps of:

in a processor means for authenticating access to the target computer, responsive to receipt of a call and call data for said call over an access facility from said network, the call data comprising a number of a caller supplied by said network, testing whether the number is in a list of numbers of users authorized to access the target computer; and if the number is in the list, connecting the call to the target computer;

responsive to receipt of said call, testing whether the number is in a reject list of the processor means; and if the number is in the reject list, disconnecting the call;

wherein the disconnecting step comprises disconnecting without returning an answer supervision signal for charging a call.

3. A method of obtaining secure authenticated telecommunications access via a communications network to a target computer comprising the steps of:

in a processor means for authenticating access to the target computer, responsive to receipt of a call and call data for said call over an access facility from said network, the call data comprising a number of a caller supplied by said network, testing whether the number is in a list of numbers of users authorized to access the target computer;

if the number is in the list, connecting the call to the target computer;

responsive to receipt of said call, testing whether the number is in a reject list of the processor means;

if the number is in the reject list, disconnecting the call; and maintaining a count of a number of calls received from a number on the reject list.

4. The method of claim 3 further comprising:

if the count exceeds a predetermined threshold, generating an alarm signal.

5. A method of obtaining secure authenticated telecommunications access via a communications network to a target computer comprising the steps of:

in a processor means for authenticating access to the target computer, responsive to receipt of a call and call data for said call over an access facility from said network, the call data comprising a number of a caller supplied by said network, testing whether the number is in a list of numbers of users authorized to access the target computer;

if the number is in the list, connecting the call to the target computer;

responsive to receipt of another call comprising other call data including another number of another caller, testing whether said another number is in a trap list; and if the another number is in the trap list, connecting the call to trap processor means for recording information about said another caller.

6. The method of claim 5 further comprising the step of:

entering a number in the trap list in response to a command from a target computer administrator.

7. The method of claim 5 further comprising:

if said another number is in the trap list, generating an alarm signal.

8. A method of obtaining secure authenticated telecommunications access via a communications network to a target computer comprising the steps of:

in a processor means for authenticating access to the target computer, responsive to receipt of a call and call data for said call over an access facility from said network, the call data comprising a number of a caller supplied by said network, testing whether the number is in a list of numbers authorized to access the target computer; and if the number is in the list, connecting the call to the target computer;

if the number is not in the list, disconnecting the call;

wherein the disconnecting step comprises disconnecting without returning an answer supervision signal for charging a call.

9. A method of obtaining secure authenticated telecommunications access to a target computer comprising the steps of:

in a processor means for authenticating access to the target computer, storing at least one first list of numbers of users defining a computer access treatment for members of each of the at least one first list and second lists for identifying customers of a first and second class;

responsive to receipt of a call in the processor means over an access facility of a communications network, testing whether a telephone number of a caller of the call supplied by said network matches a number on said at least one first list;

if no match is found, and the caller provides an identity of a customer of the first class, calling the caller back at a number associated with the caller and recorded in the second list; and if no match is found and the caller provides an identity of a customer of the second class, connecting the caller to the target computer only if the caller passes a login procedure.

10. Processor means, connected to a communications network via an integrated digital signal interface, comprising:

a list of caller identification numbers stored in a memory of said processor means authorized to access a computer, said processor means responsive to data received over said integrated digital signal interface comprising a signaling channel not controllable by a user for receiving a caller identification number over said signaling channel of said interface to check whether said received identification number matches an identification number in said list stored in said memory; and said processor means further responsive to determining that said received identification number matches said identification number in said list, controlling connection of an incoming call associated with said received identification number to a target computer.

11. The processor means of claim 10 further comprising:

another list stored in said memory of caller identification numbers whose calls are to be rejected if received;

said processor means responsive to said identification number received over said interface to check whether said received identification number matches an identification number stored in said another list; and said processor means further responsive to determining that said identification number matches said identification number stored in said another list, for controlling disconnection of an incoming call associated with said received identification number.

12. The processor means of claim 11 further comprising:

a third list of identification numbers, stored in said memory, of callers to be connected to means for recording caller data from a connected caller;

said processor means responsive to said data received over said interface to check whether said received identification number matches an identification number stored in said third list of identification numbers; and responsive to determining that said received identification number matches said identification number stored in said third list of identification numbers, controlling connection of an incoming call associated with said received identification number to said means for recording caller data.

13. A method of obtaining secure authenticated telecommunications access via a communications network to a target computer comprising the steps of:

identifying a caller telephone number by automatic number identification;

in a processor means for authenticating access to the target computer, responsive to receipt of a call and call data for said call over an access facility from said network, the call data comprising said caller number, testing whether said caller number is in an authorized user list, stored in memory of said processor means, comprising numbers of users authorized to access the target computer;

if the number is in the authorized user list connecting the call to the target computer;

testing whether the caller number is in a reject list of the processor means;

if the number is in the reject list, disconnecting the call without returning an answer supervision signal for charging a call;

maintaining a count of calls from callers having a number not on the authorized user list;

when the count for a specific caller number exceeds a predetermined threshold, adding said specific caller number to said reject list;

resting whether said caller number is in a trap list of the processor means;

if the number is in the trap list, connecting the call to processor means for recording information about a connected caller;

entering and deleting numbers to the authorized user list, the reject list and the trap list under the control of an administrator;

recording numbers for calls to the target computer;

responsive to receipt of call data for another call, wherein said data for said another call does not include a number of a caller, receiving further data from a caller of said another call identifying said caller of said another call in said processor means; and if said further data identifies an authorized user, calling said caller of said another call back at a number stored in another list of users authorized to access the target computer;

wherein the list of authorized users comprises a plurality of sublists each sublist corresponding to at least one of a plurality of port groups of the target computer and wherein the connecting step comprises:

if the number is in a specific one of the plurality of sublists, connecting the call to one of the ports of the at lest one of the port groups corresponding to the specific one of the plurality of sublists.

14. A method of obtaining secure authenticated telecommunications access via a communications network to a target computer comprising the steps of:

in a processor means for authenticating access to the target computer, responsive to receipt of a call and call data for said call over an access facility from said network, the call data comprising a number of a caller supplied by said network, testing whether the number is in a list of numbers of users authorized to access the target computer;

if the number is in the list, connecting the call to the target computer;

responsive to receipt of another call and called at a for said another call, wherein said call data for said another call does not include a number of a caller, receiving further data from a caller of said another call, identifying said caller of said another call;

if said further data identifies an authorized user, calling said caller of said another call back at a number stored in another list of users authorized to access the target computer; and if said further data does not identify an authorized user, connecting said caller to a signal for identifying a telephone number for receiving assistance in establishing a call to said target computer.

* * * * *

UNITED STATES PATENT AND TRADEMARK OFFICE
CERTIFICATE OF CORRECTION

PATENT NO. : 5,003,595

DATED : March 26, 1991

INVENTOR(S) : Cynthia B. Collins, Francis T. Lynch, Kay L. Mueller

It is certified that error appears in the above-identified patent and that said Letters Patent is hereby corrected as shown below:

Column 7, claim 1, line 53, delete "called at a" and substitute --call data--.

Column 10, claim 13, line 50, delete "resting" and substitute --testing--.

Column 11, claim 13, line 8, delete "lest" and substitute --least--.

Column 12, claim 14, line 5, delete "called at a" and substitute --call data--.

Signed and Sealed this

Sixth Day of October, 1992

Attest:

DOUGLAS B. COMER

Attesting Officer

Acting Commissioner of Patents and Trademarks